United States Patent
Bloomer

(10) Patent No.: US 6,206,433 B1
(45) Date of Patent: Mar. 27, 2001

(54) COMBUSTION AIR CONDUIT COUPLING

(75) Inventor: Stephen F. Bloomer, London (CA)

(73) Assignee: Siemens Canada Limited, Ontario (CA)

( * ) Notice: Subject to any disclaimer, the term of this patent is extended or adjusted under 35 U.S.C. 154(b) by 0 days.

(21) Appl. No.: 09/342,699

(22) Filed: Jun. 29, 1999

(51) Int. Cl.⁷ .................................................. F16J 15/00
(52) U.S. Cl. ................... 285/88; 285/87; 285/82
(58) Field of Search .................. 285/33, 87, 88, 285/82, 319, 360, 361, 376, 396, 401, 402, 38

(56) References Cited

U.S. PATENT DOCUMENTS

| 149,728 | * | 4/1874 | Diehl et al. | 285/88 |
|---|---|---|---|---|
| 702,436 | * | 6/1902 | Johnston | 285/88 |
| 765,225 | * | 7/1904 | Colin | 285/88 |
| 808,008 | * | 12/1905 | Cagle | 285/88 |
| 830,907 | * | 9/1906 | Lund | 285/87 |
| 981,866 | * | 1/1911 | Lockhart | 285/87 |
| 1,038,948 | * | 9/1912 | Patrick | 285/87 |
| 1,259,684 | * | 3/1918 | Vinten | 285/360 |
| 2,315,981 | * | 4/1943 | Olson | 285/87 |
| 5,215,336 | * | 6/1993 | Worthing | 285/81 |
| 5,301,985 | * | 4/1994 | Terzini | 285/79 |
| 5,397,196 | * | 3/1995 | Boiret et al. | 403/348 |
| 5,651,732 | * | 7/1997 | Dufour | 454/47 |
| 5,960,819 | * | 10/1999 | Weissinger et al. | 137/315 |

* cited by examiner

Primary Examiner—Teri Pham Luu

(57) ABSTRACT

A coupling is disclosed for connecting conduits that carry combustion air to an internal combustion engine. Two conduits are provide, a first one having an associated locking collar with slots and flexible locking fingers, and a second one having several outwardly facing pins and catches located on an outer surface. The pins are received in the slots and the two conduits are rotated with respect to each other. The catches and locking fingers engage to prevent the two conduits from being pulled apart. Both conduits and locking collar are preferably made of plastic, with the second one and its associated locking collar being simltaneously and integrally molded. A resilient seal may be located between the two components to reduce or eliminate air leakage.

14 Claims, 4 Drawing Sheets

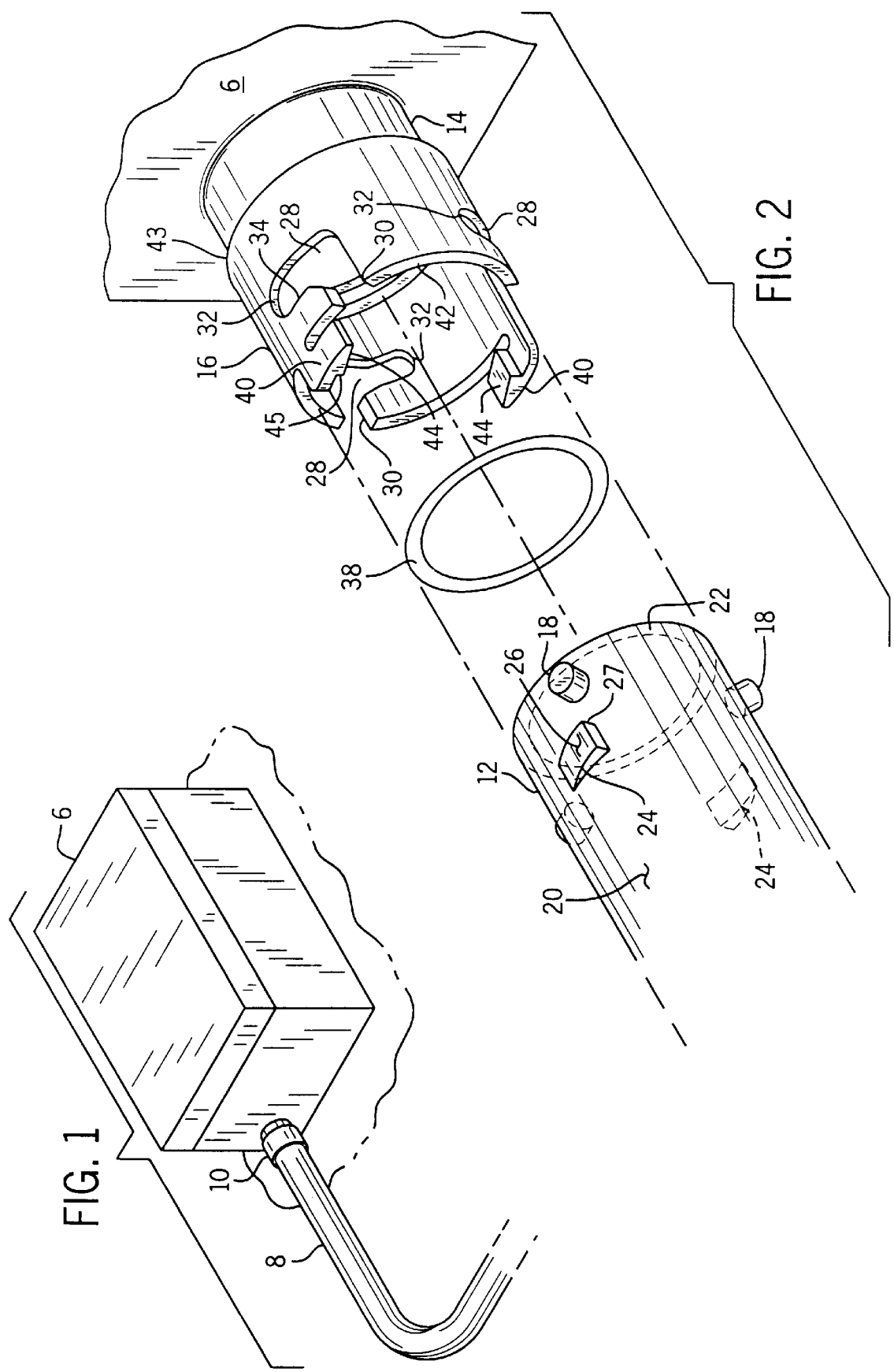

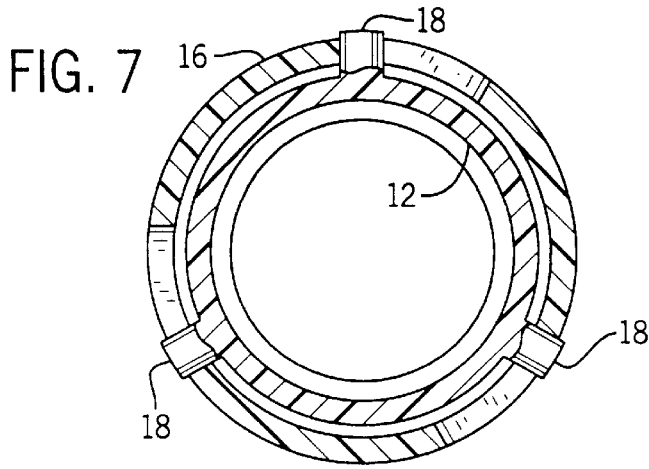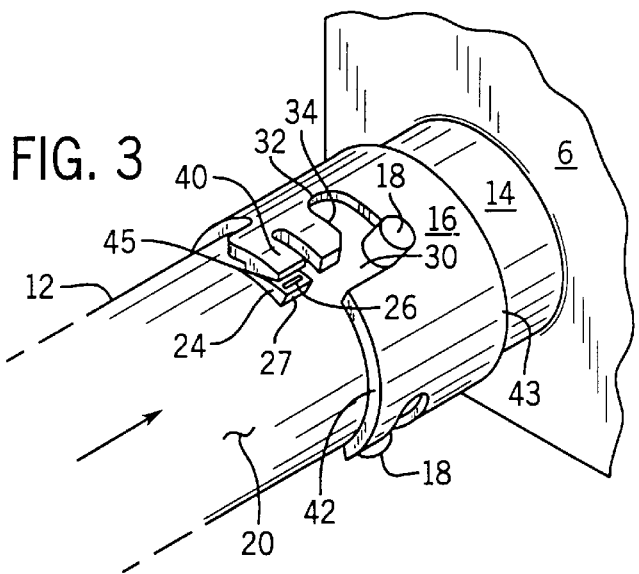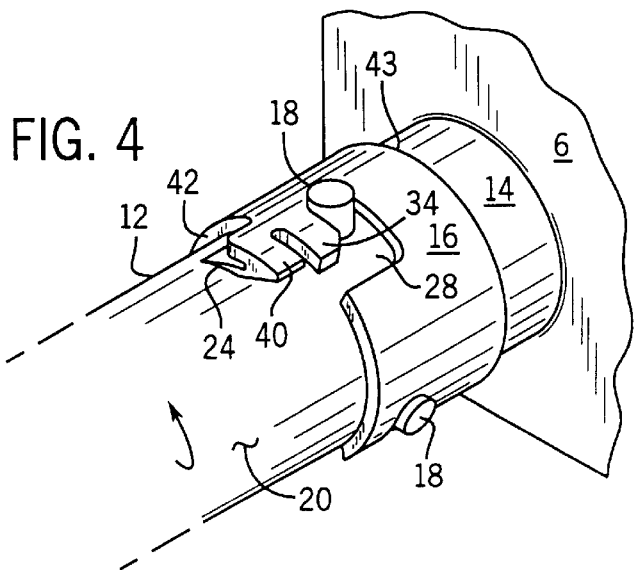

COMBUSTION AIR CONDUIT COUPLING

FIELD OF THE INVENTION

The invention relates generally to air conduits for conducting combustion air to internal combustion engines of engine-driven vehicles. More particularly it relates to quick-connect couplings for such conduit.

BACKGROUND OF THE INVENTION

Most modern automobiles are crowded in the engine compartment, and therefore require numerous components to be removed and replaced whenever routine maintenance is performed. In addition, and due to this crowding, air induction components are often scattered about the engine compartment. To connect these scattered air induction components, conduits are provided to conduct air throughout the engine compartment.

Due to the crowding, these conduits often must have complex profiles, permitting them to fit around and between the other components. For this reason, plastics such as nylon are often used to make the conduits since these materials permit the molding of complex shapes and are also highly resistant to the elevated temperatures in the engine compartments. These shapes, however, are typically not molded as single pieces, but are assembled from conduit subcomponents due to the difficulty in molding them as a single unit.

As a result, the subcomponents have numerous joints whereby they are coupled. These joints must be air tight to prevent air leaks, yet must also be readily assembled and disassembled whenever repairs or periodic maintenance is required. Screwed or clamped joints suffer from several disadvantages in this environment. They can be overtightened, causing the plastic conduits to warp and fatigue. This can cause air leaks which in turn cause the engine to run poorly.

Furthermore, because of the underhood crowding, these joints often require additional parts such as screws and clamps that are difficult to orient and support during assembly, thus increasing the risk that they will be dropped and lost.

What is needed, therefore, is an improved conduit coupling that can be quickly and easily removed. What is further needed is a coupling that does not require additional parts, but is formed integrally with the conduits themselves. It is an object of this invention to provide such a conduit coupling.

SUMMARY OF THE PRESENT INVENTION

In accordance with a first embodiment of the invention, a coupling is provided for joining two portions of an air conduit that includes a first polymeric conduit having a cylindrical portion with several spaced apart locking pins and catches extending from its outer surface, and a second polymeric conduit having a cylindrical portion and a locking collar fixed to the cylindrical portion in which the first polymeric conduit is placed.

The second conduit has slots in the locking collar that engage the locking pins, and flexible fingers that engage the catches. The catches and flexible fingers prevent the two conduits from rotating with respect to each other in a direction that would permit the locking pins and slots to disengage.

The locking and corresponding fingers are preferably disposed evenly about the circumference of their respective conduits. The flexible fingers are preferably located so that they are deflected axially away from the longitudinal axis of the second conduit to disengage the catches on the first conduit.

Other principal features and advantages of the invention will become apparent to those skilled in the art upon review of the following drawings, the detailed description and the appended claims.

BRIEF DESCRIPTION OF THE DRAWINGS

FIG. 1 is a perspective view of an air cleaner housing with attached conduit having an line coupling;

FIG. 2 is a partially exploded perspective view of the coupling of FIG. 1 showing the details of its construction and how it is coupled to the air cleaner housing;

FIG. 3 is perspective view of the arrangement of FIG. 2 after conduit 12 is inserted axially into locking collar 16;

FIG. 4 is a perspective view of the arrangement of FIG. 3 after conduit 12 has been rotated to engage its pins to the slots of the locking collar, and its catches to the flexible fingers of the locking collar;

FIG. 7 is a cross-sectional view of the coupling of FIG. 6 taken at section 7—7;

Figure 5:
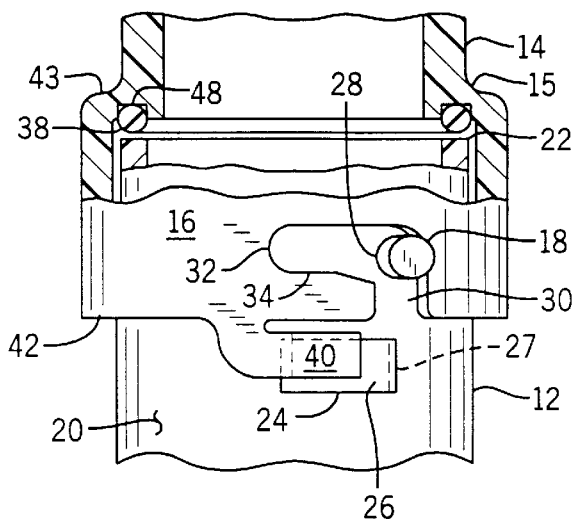
FIG. 5 is a partial cross-sectional view of the coupling of the FIG. 3 showing the arrangement of the mating surfaces of conduits 12 and 14 and the resilient seal after axial insertion and before rotation.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

In FIG. 1, an air filter housing 6 is shown. It contains an air filter (not shown) for filtering the combustion air of an internal combustion engine. A conduit 8 is coupled to and extends from housing 6 to carry either filtered air from housing 6 or unfiltered air to housing 6.

Referring to FIGS. 1 and 2, conduit 8 includes a coupling 10 for joining two air conduit portions 12, 14. The coupling includes a first conduit portion 12 and a second conduit portion 14, joined together by a locking collar 16 that is integrally formed with second conduit 14. Both conduits and locking collar are integrally molded from a heat resistant plastic that is appropriate for use in the engine compartment of a motor vehicle, such as nylon.

The coupling is configured to couple the two conduit portions 12, 14 together by rotating one with respect to the other. First conduit 12 is preferably cylindrical to permit it to rotate within locking collar 16 during engagement and disengagement of the two conduit portions. Similarly, second conduit portion 14 is also preferably cylindrical to more easily mate with first conduit portion 12. Conduit portion 12 is first inserted into locking collar 16 formed integral with conduit portion 14, as shown in FIG. 3 and is rotated to the position shown in FIG. 4.

In the engaged position of FIG. 4, locking pins 18 engage with slots in the locking collar preventing the two portions from being axially pulled apart, and several catches 24 engage to prevent the conduits from being rotated with respect to each other.

Referring back to FIG. 2, conduit 12 has several protrusions or pins 18 that act as locking pins to engage slots in the locking collar. These pins are preferably integrally molded with conduit 12. Pins 18 protrude axially away from outer surface 20 of conduit 12 and are preferably spaced substantially the same distance from end 22 of conduit 12 to therefore provide a relatively constant holding force when the joint is assembled. In this manner, the pins collectively define a plane that is generally perpendicular to the longitudinal axis of conduit 12.

Figure 8:
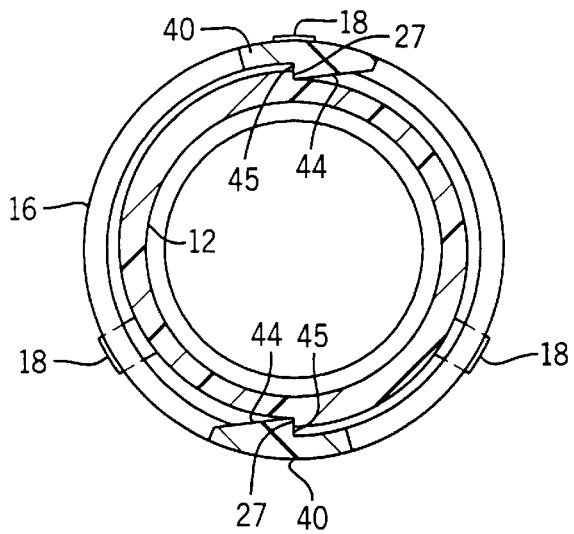
FIG. 8 is a cross-sectional view of the coupling of FIG. 6 taken at section 8—8.

Pins 18 are also distributed substantially evenly and equiangularly about the circumference of conduit 12. This tends to distribute any flexural load applied to the coupling evenly about the periphery of the locking ring 16. As shown in FIGS. 7 and 8, for example, there are three pins, spaced generally 120 degrees apart. If a coupling with two pins were provided, they would preferably be spaced generally 180 degrees apart. If a coupling with four pins were provided, they would preferably be spaced generally 90 degrees apart, et cetera.

If the two conduit portions were rotated with respect to each other from the position shown in FIG. 4, pins 18 would become disengaged from locking collar 16, and the two conduit portions would easily pull or fall apart. To prevent this, conduit 12 has several catches 24 that extend axially outward from the outer surface of conduit 12 that mate with locking fingers on locking collar 16. Catches 24 are also integrally formed with conduit 12, and are preferably spaced substantially the same distance from open end 22 of conduit 12. In this manner, they collectively define a plane that is generally perpendicular to the longitudinal axis of conduit 12.

Catches 24 are preferably spaced farther away from end 22 of conduit 12 than are pins 18. The plane that they define is therefore farther from end 22 than the plane defined by pins 18. Catches 24 are disposed to engage with flexible fingers on the locking collar such that the catches and the flexible fingers, once engaged, prevent the two conduits from being twisted apart and separated.

Each of catches 24 includes an axially outward facing ramp 26. Each of catches 24 also has a locking surface 27 that is substantially coplanar with the longitudinal axis of conduit 12. A similar surface is provided on the locking fingers that is substantially coplanar with the longitudinal axis of locking collar 16.

When the two conduit portions 12, 14 are joined together, ramp 26 engages its associated flexible finger and elastically deflects that finger axially outward and away from the longitudinal axis of conduit 12. When the two conduits are rotated into their ultimate engaged position, the flexible finger snaps back into a relaxed position such that locking surface 27 of conduit 12 and a similarly disposed locking surface on the flexible finger engage each other. At this point, the flexible fingers must be bent axially outward to disengage their locking surfaces to release the flexible finger from its catch. To provide this positive locking, the mating surfaces are coplanar with their respective axes. However, since different conduit materials may have different coefficients of friction they may be disposed only substantially coplanar with their respective axes to provide the positive locking.

Locking collar 16 is fixed to the end of conduit 14 and is generally circular in cross section. It is preferably coaxial with conduit 14. Collar 16 has a free end 42, and a fixed end 43 that is formed integral with end 15 of conduit 14. Locking collar 16 includes slots 28 and flexible fingers 40 that engage pins 18 and catches 24 of conduit 12, respectively.

Locking collar 16 is substantially cylindrical which permits it to engage and rotate on the outer surface of conduit 12. Its internal diameter is slightly larger than the outer diameter of conduit 12, to permit conduit portion 12 to be inserted in locking collar 16 and to be rotated with respect to it without the application of undue force that otherwise might cause breakage.

Figure 6:
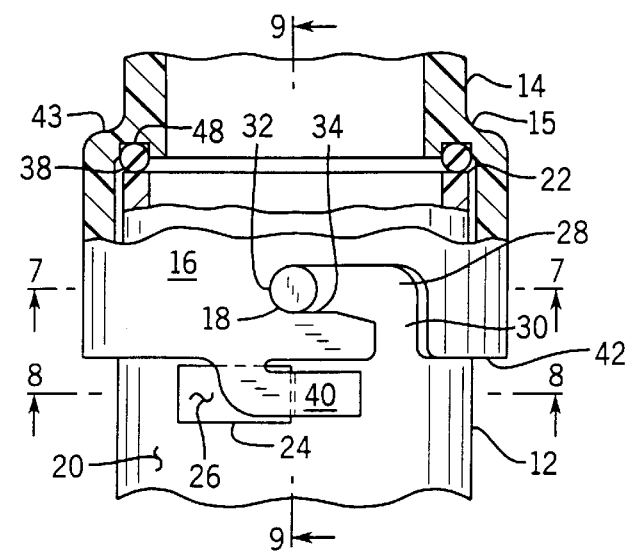
FIG. 6 is a partial cross-sectional view of the coupling of FIG. 4 showing the arrangement of the mating surfaces and the resilient seal in a compressed condition after axial insertion and rotation.
Figure 9:
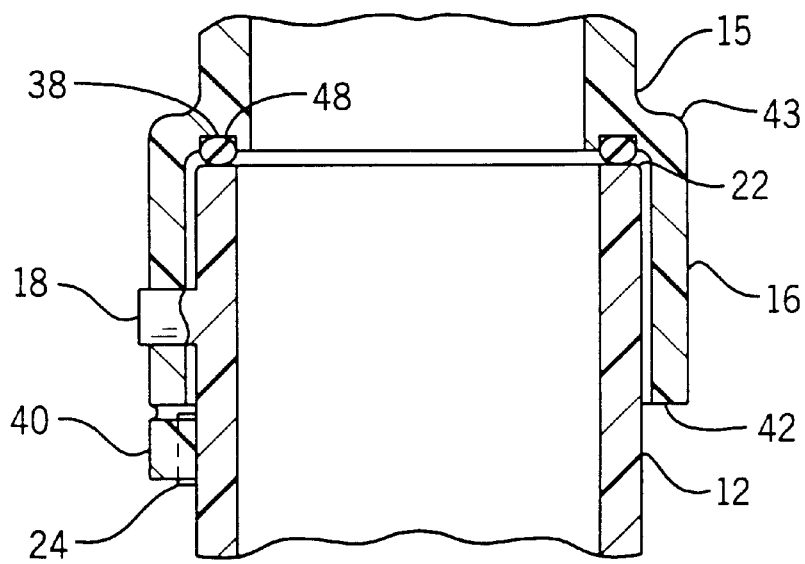
FIG. 9 is a cross-sectional view of the coupling of FIG. 6 taken at section 9—9.

Slots 28 are provided in locking collar and have a pin entrance 30 into which pins 18 are inserted, an end wall 32, and a retaining wall 34. Slots 28 are preferably not straight, but turn in a circumferential direction as their length is traversed from entrance 30 to end wall 32. This permits pins 18 to be inserted by moving conduit 12 axially toward locking collar 16, and by rotating conduit 12 about its longitudinal axis until pins 18 are adjacent to the end walls 32 of slots 28. This wall arrangement is best shown in FIGS. 5 and 6.

Each of slots 28 has a retaining wall 34 that abuts pins 18 when they are fully inserted into the slots. The retaining walls keep conduit 12 from being axially withdrawn without prior rotation. These retaining walls are substantially perpendicular to the longitudinal axis of locking collar 16. This perpendicularity is sufficient to provide a consistent air seal between the end 22 of conduit 12 and resilient seal 38 which abuts end 22 in the coupled position. The perpendicularity of retaining wall 34 can vary in different applications depending upon the resiliency of seal 38.

Several locking fingers 40 extend from free end 42 to engage catches 24. Each has a ramp 44 that engages ramp 26 on conduit 12. When ramps 44 and 26 engage during assembly, fingers 40 are deflected outward, away from the longitudinal axis of locking collar 16 until they reach the top of the ramp, at which point surface 45 of locking fingers snaps down behind surface 27 of conduit 12 as best seen in FIGS. 2 and 8. This locks the two conduits together and prevents their relative rotation until locking fingers 16 are flexed away from conduit 12 and surfaces 45, 27 are disengaged.

Conduit portion 14 is fixed to end 43 of locking collar 16. Conduit 14 is preferably made of a nylon plastic and is molded integral and simultaneously with locking collar 16 and of the same material. Conduit portion 14 is smaller in diameter than locking collar 16, preferably having generally the same inner diameter as conduit portion 12. This common inner diameter provides for smooth air flow through the conduit portions, even though there is a joint coupling them.

As best shown in FIGS. 2, 5 and 6, a resilient seal 38 is disposed between end 22 of conduit portion 12 and end 15 of conduit portion 14. This seal reduces air leakage out of the coupling and is especially beneficial in arrangements where the conduits and locking collar are formed of plastic. Since it is difficult to make plastic parts precisely, the provision of a separate resilient seal insures that air leakage will be minimized. Ends 22 and 15 define mating surfaces that are substantially perpendicular to the longitudinal axes of conduits 12 and 14. A groove 48 is provided in end 15 of conduit 14 to support resilient seal 38 when it is compressed and prevent it from popping out into the air flow path when it is compressed. This arrangement provides full compression of seal 38. When conduit 12 is first inserted into locking collar 16, seal 38 is not compressed, as shown in FIG. 5. As the two conduit portions are rotated with respect to each other, the orientation of retaining wall 34 that engages pin 18 causes conduit 12 to be drawn farther into locking collar 16. The force applied by retaining wall 34 against pin 18 during rotation compresses resilient seal 38 between ends 22 and 15 thereby providing a substantially air tight seal.

Figure 10:
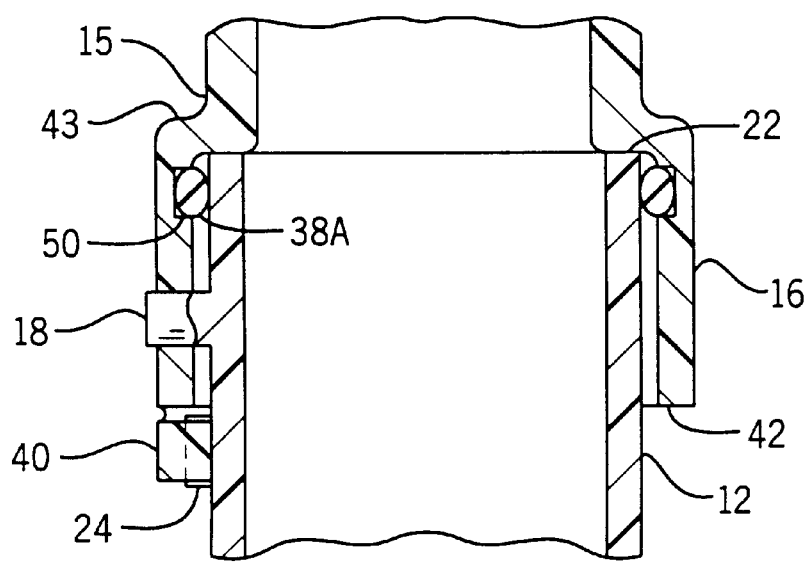
FIG. 10 is a cross-sectional view similar to FIG. 9 but showing an alternative arrangement of a resilient seal disposed between the locking collar and conduit 12.

In an alternative embodiment, resilient seal 38A may be disposed between the outer circumferential surface of conduit 12 and an inner circumferential surface of locking collar 16. As shown in FIG. 10, resilient seal 38A is disposed in a circumferential groove 50 located on the inner surface of locking ring 16. This groove retains resilient seal 38A when the conduits are disassembled. Alternatively, a circumferential groove may be provided on the outer surface of conduit portion 12 in substantially the same axial location.

Thus, it should be apparent that there has been provided in accordance with the present invention a combustion air conduit coupling that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A coupling for joining two polymeric air conduits that conduct combustion air to an internal combustion engine, comprising:
 a first integrally molded cylindrical polymeric conduit further comprising,
 a first cylindrical body having a first inner surface with a first inner diameter, a first outer surface with a first outer diameter, a longitudinal axis, and a first open end substantially perpendicular to the longitudinal axis,
 a plurality of locking pins extending radially outward from the outer surface of the conduit and spatially distributed about the circumference of the cylindrical body, surface; and
 a plurality of catches extending radially outward from the outer surface, said plurality of catches spaced longitudinally from said plurality of locking pins; and
 a second integrally molded cylindrical polymeric conduit further comprising,
 a second cylindrical body having a second inner diameter and a second end substantially parallel to the longitudinal axis, and
 a locking collar integrally molded with the second cylindrical body and having a collar inner diameter, a plurality of slots each of which configured to receive one of the plurality of locking pins, and a plurality of flexible fingers disposed to engage the plurality of catches.

2. The coupling of claim 1, wherein the plurality of catches are disposed along the first cylindrical body longitudinally farther from the first open end than the plurality of locking pins.

3. The coupling of claim 2, wherein the plurality of flexible fingers and the plurality of catches interengage to positively lock the first conduit to the second conduit.

4. The coupling of claim 3, wherein the diameter of the first inner surface and the second inner surface are substantially the same.

5. The coupling of claim 4 wherein the locking collar extends beyond the end of the second cylindrical body.

6. The coupling of claim 4 wherein each of the plurality of catches include a radially outward facing surface to engage each of the corresponding plurality of flexible fingers.

7. The coupling of claim 1 wherein the plurality of locking pins are spaced substantially equiangularly about the circumference of the first conduit and the plurality of slots are engaged equiangularly about the circumference of the locking collar.

8. The coupling of claim 1, further comprising a resilient sealing ring disposed about the outer surface of the first cylindrical body and facing axially outward.

9. The coupling of claim 8, wherein the resilient sealing ring is disposed to engage the inner surface of the locking collar.

10. The coupling of claim 1, further comprising a resilient sealing ring disposed between the first end and the second end to seal the first end to the second end.

11. A coupling for joining two air conduits that conduct combustion air in an internal combustion engine, comprising:
 a first cylindrical polymeric conduit having a first longitudinal axis further comprising,
 a first cylindrical body having a first inner surface with a first inner diameter, a first outer surface with a first outer diameter, a longitudinal axis and a first open end substantially perpendicular to the longitudinal axis,
 a plurality of locking pins extending radially outward from the outer surface of the cylindrical body and spatially distributed about the circumference of the cylindrical body and disposed a first distance away from the open end,
 a plurality of catches extending radially outward from the outer surface and disposed a distance greater than the first distance away from the first end; and
 a second cylindrical polymeric conduit having a second longitudinal axis and further comprising,
 a second cylindrical body having a second inner diameter and a second end substantially parallel to the longitudinal axis, and
 a locking collar integrally molded with the second cylindrical body and having a collar inner diameter, a plurality of slots each of which are configured to receive one of the plurality of locking pins and a plurality of flexible fingers disposed to engage the plurality of catches.

12. The coupling of claim 11, wherein the first and second longitudinal axes are substantially the same.

13. The coupling of claim 12, wherein the collar inner diameter is substantially the same as the first outer diameter, and further wherein the locking collar has an outer surface and the plurality of locking pins extend to the outer surface.

14. The coupling of claim 13, wherein the plurality of flexible fingers extend to the outer surface of the locking collar, and each has a manually graspable tab portion at an end thereof.

* * * * *